United States Patent [19]

Williams et al.

[11] Patent Number: 4,693,444
[45] Date of Patent: Sep. 15, 1987

[54] HEIGHT ADJUST MECHANISM

[75] Inventors: Glenn T. Williams, Huntsville; Michael D. Thomas, Arab, both of Ala.

[73] Assignee: Intergraph Corporation, Huntsville, Ala.

[21] Appl. No.: 757,378

[22] Filed: Jul. 22, 1985

[51] Int. Cl.$^4$ .............................................. A47F 5/12
[52] U.S. Cl. ...................................... 248/653; 248/1; 248/665; 248/456; 248/439; 108/7; 400/682
[58] Field of Search ............................... 248/652–653, 248/655, 658, 664–665, 666–667, 669, 677, 649, 454–457, 460, 463–464, 133, 137, 139–142, 371, 372.1, 398, 439, 397, 293, 359, 166, 168, 170, 188.1, 188.2, 188.6, 1 C, 1 H, 1 I, 1 B; 108/6, 7, 9; 400/681–682; 74/575–576, 577 R, 577 S, 577 M, 577 SF

[56] References Cited

U.S. PATENT DOCUMENTS

| 422,673 | 3/1890 | Werner . |
| 1,836,053 | 12/1931 | Wagner . |
| 4,402,624 | 9/1983 | Stahl . |
| 4,421,035 | 12/1983 | Gubbe . |
| 4,527,149 | 7/1985 | Swensen . |

FOREIGN PATENT DOCUMENTS 1174687 3/1959 France .

OTHER PUBLICATIONS

Greenfield, J., "Keyboard Assembly", IBM Technical Disclosure Bulletin, vol. 25, No. 8, Jan., 1983, pp. 4265–4267.
Kelley, T. F., "Keyboard-Angle Adjustment", IBM Technical Disclosure Bulletin, vol. 24, No. 12, May, 1982, p. 6556.
"Keyboard Tilt Mechanism", IBM Technical Disclosure Bulletin, vol. 27, No. 10B, Mar., 1985, pp. 6100–6102.
Allen, D., "Dual Tilt Support Legs for Keypad", IBM Technical Disclosure Bulletin, vol. 26, No. 7A, Dec., 1983, pp. 3277–3278.
Frank, E. H., "Adjustable Keyboard Mechanism", IBM Technical Disclosure Bulletin, vol. 25, No. 4, Sep., 1982, pp. 1978–1979.

Primary Examiner—J. Franklin Foss
Assistant Examiner—Robert A. Olson
Attorney, Agent, or Firm—Cushman, Darby & Cushman

[57] ABSTRACT

A height adjust mechanism which may be advantageously used to set a keyboard to a predetermined number of angles with respect to a support surface upon which the keyboard sits. The apparatus is integral with the keyboard base and includes an adjustment foot member having a ratchet surface with four detents therein. The foot member is pivotally mounted within the keyboard base and extends downward through a hole in the keyboard base. An adjustment lever is also pivotally mounted within the keyboard base and includes a pawl which engages one of the detents of the adjustment foot member. A single spring is connected to the adjustment foot and to the adjustment lever. This spring biases the adjustment foot in a downward direction, while at the same time biasing the adjustment lever so that the pawl positively engages one of the detents of the ratchet surface. This apparatus is capable of lifting the back of a keyboard by a distance which is greater than the vertical distance which the apparatus consumes inside the keyboard base.

17 Claims, 4 Drawing Figures

HEIGHT ADJUST MECHANISM

BACKGROUND OF THE INVENTION

1. Field of the Invention

This invention relates to a height adjusting mechanism. More particularly, this invention relates to a mechanism having means which are integrally mounted with a base of an object and allow the object to be locked at a desired angle of inclination with respect to a support surface. More specifically, this invention relates to an apparatus having spring-biased ratchet and pawl devices which can be easily manipulated to provide the desired angle of inclination.

2. Description of the Prior Art

With the increasing number of computers in our society, greater numbers of individuals are operating computer keyboards both at work and at home. For ease of operation, and the comfort of the user, it is desirable to adjust the angle at which the computer keyboard rests on a supporting surface.

It is known to arrange work surfaces so as to be inclinable about an essentially horizontal pivot axis. Such known solutions include hinged surfaces with fixing screws, screw mechanisms adjustable in a vertical direction, and tripod devices having legs to support the work surface. None of these devices is advantageously used in a computer keyboard since these devices would be expensive to manufacture, would require too much space inside the keyboard, or would be unwieldy to operate and incapable of providing a stable support.

One known apparatus for locking a keyboard at a selected angle of inclination to a horizontal surface is disclosed in U.S. Pat. No. 4,421,035 to Gubbe et al. The Gubbe et al angle adjusting device is mounted on the support surface and thus, is external to the keyboard. An obvious disadvantage of such a device is that the keyboard can only be operated on specially adapted work surfaces. Thus, the computer keyboard cannot be moved and operated from a variety of table or desk tops.

SUMMARY OF THE INVENTION

To solve the above-mentioned problems, the inventors have discovered a novel height adjusting device which is particularly suited for computer keyboards and is inexpensive to manufacture, easy to assemble, and simple to operate.

The present invention provides a novel apparatus for adjusting the angle of an object comprising an adjustment foot pivotally mounted within the object to raise the object, and an adjustment lever pivotally mounted within the object for engaging the adjustment foot to cause the object to be supported at a given distance from the support surface.

The adjustment foot may be so constructed that the apparatus will raise the object a height which is greater than the height required inside the object to accommodate the apparatus. The adjustment foot may be provided with a ratchet surface so that the object may be raised to one of a series of predetermined positions. A spring may be provided to simulatneously bias the adjustment foot downward and bias the adjustment lever to engage the ratchet surface. The spring may be attached to the adjustment foot and adjustment lever by spring fixing pins so that assembly of the mechanism may be simplified.

Although the preferred embodiment described below shows the angle adjust mechanism used in the environment of a keyboard, and although certain special advantages result from such a use, the present invention may be employed to adjust the height of any object.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompany drawings, of which.

DETAILED DESCRIPTION OF THE PRESENTLY PREFERRED EXEMPLARY EMBODIMENT

Figure 1:
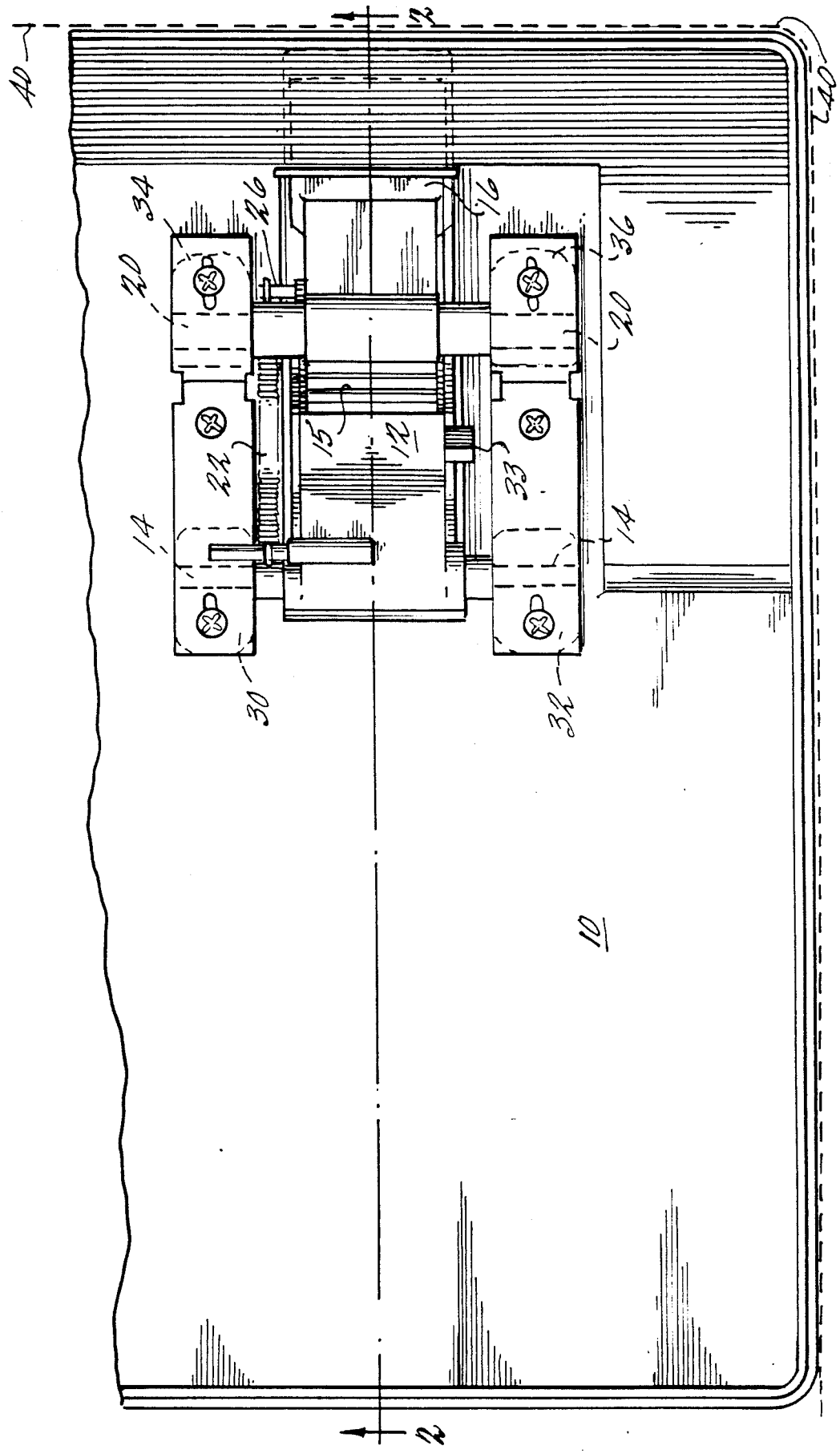
FIG. 1 is a top view of a preferred embodiment of the present invention.

Referring to FIGS. 1–4, an exemplary, preferred embodiment of the present invention is depicted mounted within a keyboard. Keyboard base 10 is the bottom portion of a keyboard and rests on support surface 11. The angle between keyboard base 10 and support surface 11 may be varied by rotating adjustment foot 12 around its pivot axis 14. Adjustment foot 12 is pivotally mounted to keyboard base 10 by axle 14 which is attached to support members 30 and 32 (See FIG. 1). Adjustment foot 12 includes a ratchet surface 15 having, for example, four detents for fixing the height to which the back of the keyboard base may be raised. Adjustment foot 12 also has a stopping pin 33 which will come into contact with the bottom of keyboard base 10 when adjustment foot 12 is fully extended (See FIGS. 1 and 4).

Adjustment lever 16 includes pawl 18 which engages one of the detents in ratchet surface 15. Adjustment lever 16 is pivotally mounted about its axle 20.

For ease of operation, adjustment foot 12 should be spring-loaded to provide a positive downward force so that an operator can adjust the angle of the keyboard by merely lifting up the keyboard. At the same time, it is desirable to spring-load pawl 18 so that a positive locking force is provided between pawl 18 and the detent to which it is engaged. The inventors have provided a single spring means 22 which performs both of these functions. One end of spring 22 is attached to adjustment foot 12 at a spring fixing pin 24. Spring fixing pin 24 is mounted on adjustment foot 12 in such a position that contraction of spring 22 applies a positive downward force to adjustment foot 12. The other end of spring 22 is fixed to a second spring fixing pin 26 which is attached to adjustment lever 16. Thus, the same spring 22 will bias adjustment foot 12 downward and at the same time bias pawl 18 to engage one of the detents of ratchet surface 15.

Spring fixing pins 24 and 26 are uniquely designed so that spring 22 may remain on said pins without the requirement of fixing means such as screws, notches, or holes. The first spring fixing pin 24 is made to have a length which is sufficient to prevent the end of spring 22 from sliding off first spring fixing pin 24. Spring fixing pin 26 is arranged so as to have a small clearance between the end of pin 26 and support member 34. The end of the spring which is fixed to the second spring fixing pin 26 will be incapable of sliding between the end of fixing pin 26 and support 34. Thus, the spring mechanism is inexpensive to manufacture and easy to assemble while providing the desired spring biasing to the apparatus.

Figure 2:
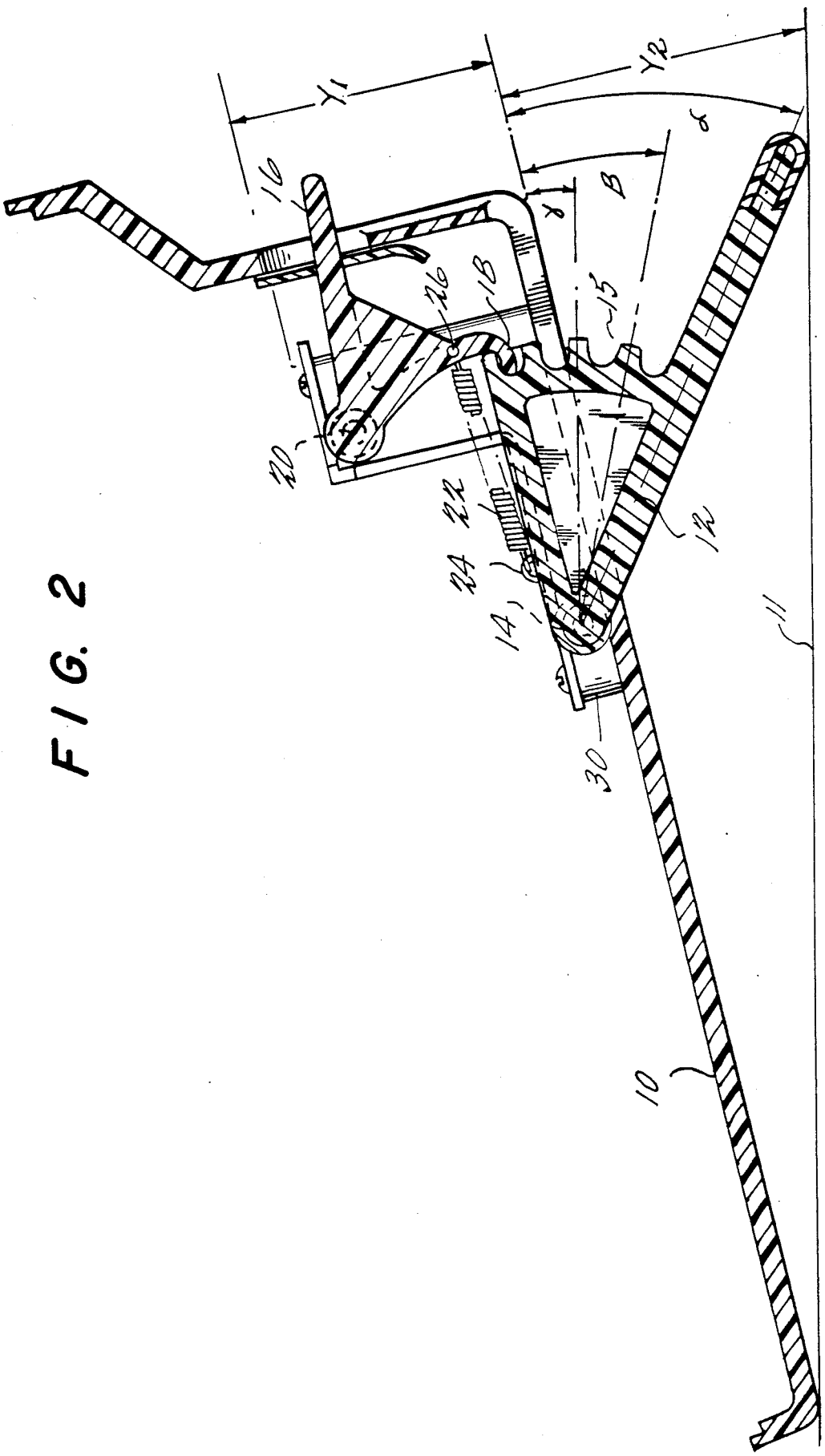
FIG. 2 is a sectional view of the apparatus according to the preferred embodiment.
Figure 3:
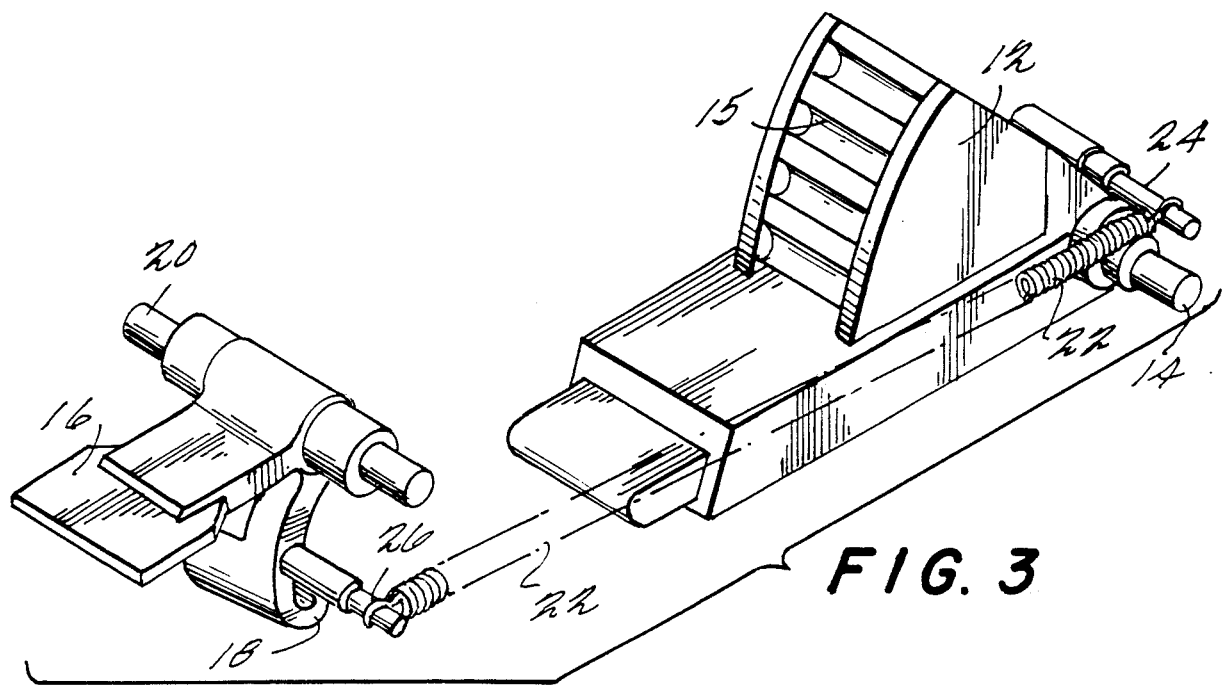
FIG. 3 is an exploded perspective view of the adjustment foot and the adjustment lever of the preferred embodiment.

In FIG. 2 it can be seen that four detents are provided on ratchet surface 16 so that the adjustment foot 12 defines angles of $\alpha$, $\beta$, $\gamma$ and 0° with respect to the bottom of base 10. When adjustment foot 12 is positioned at angle $\alpha$, it can be seen that the vertical distance between the end of adjustment foot 12 and the bottom of the keyboard base 10 defines a distance $Y_2$. FIG. 2 also shows that the vertical distance of the preferred embodiment inside the keyboard base 10 is a distance $Y_1$. A unique feature of the present invention is that the distance $Y_2$ is greater than the distance $Y_1$. Thus, the present invention is capable of lifting a keyboard a distance greater than the vertical space of the apparatus within the keyboard itself.

According to the preferred embodiment of the present invention, the distance $Y_2$ is approximately equal to 1.4 inches, while the distance $Y_1$ is equal to approximately 1.0 inches. The angles $\alpha$, $\beta$ and $\gamma$ are approximately equal to 45°, 28°, and 14°, respectively. These angles are capable of providing the most commonly preferred angles of inclination between keyboard base 10 and support surface 11.

Figure 4:
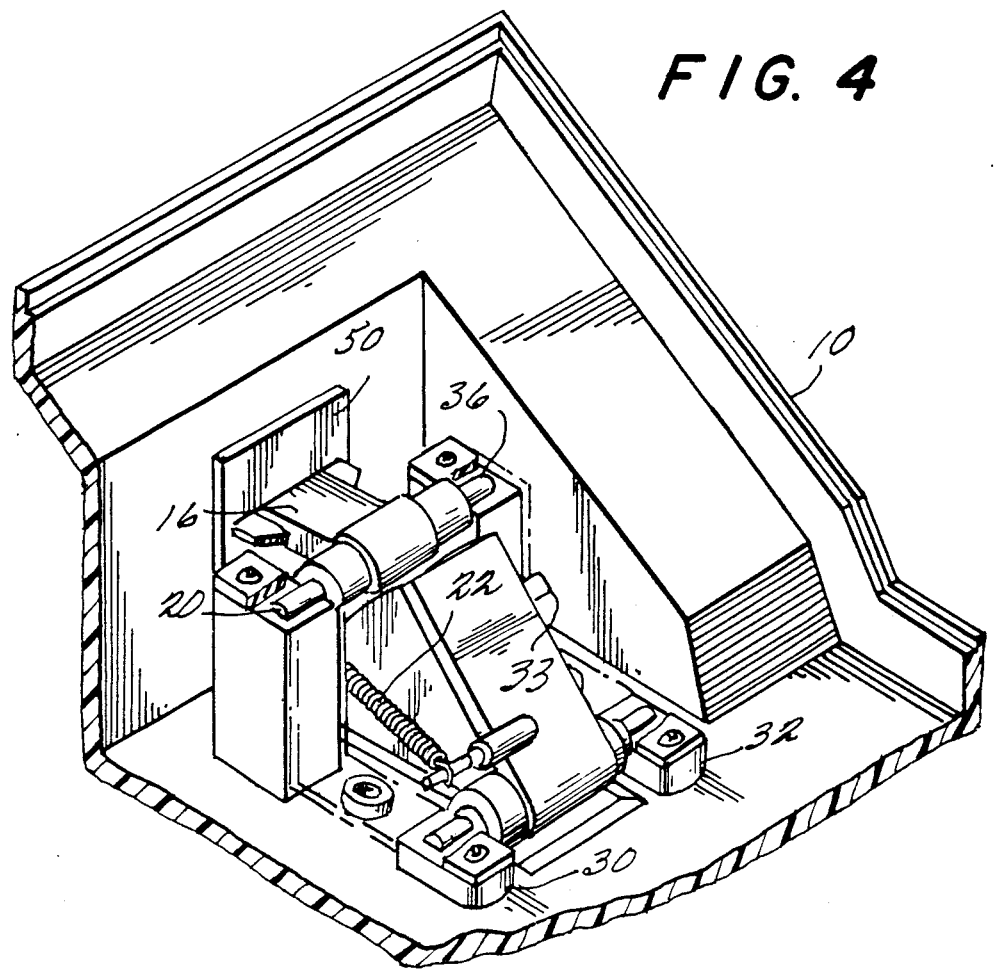
FIG. 4 is a perspective view of the apparatus of the preferred embodiment mounted within a keyboard base.

As illustrated in FIG. 4, optionally, adjustment lever 16 may be fitted with a shield 50 on the inside of keyboard base 10 to prevent foreign particles from entering keyboard base 10.

It can be seen from FIG. 1 that keyboard base 10 defines a rectangular volume having a boundary 40. A novel feature of the present invention is that the apparatus is designed to be entirely enclosed within boundary 40. Thus, a keyboard equipped with the device according to the present invention would not require additional desk top space for the keyboard.

In practice, it is preferable to provide a keyboard base with one angle adjustment mechanism according to the present invention mounted at each of the two rear corners of the keyboard. By adjusting both of the angle adjust mechanisms to the same position, stable support for the keyboard may be provided at any one of four angles.

In operation, when a user desires to adjust the angle of the keyboard to the support surface, the user merely lifts up adjustment lever 16 on each angle adjusting device. By lifting up adjustment lever 16, pawl 18 is disengaged from the detents of ratchet surface 15 releasing adjustment foot 12. Adjustment lever 12 is spring-biased in the downward direction and therefore, the end of adjustment foot 12 will stay in contact with support surface 11. Holding up on adjustment lever 16, the operator adjusts the keyboard to a desired angle and then releases adjustment lever 16. When adjustment lever 16 is released, spring 22 forces pawl 18 into one of the detents of ratchet surface 15, thus locking the keyboard at the desired angle.

Thus, the present invention provides an angle adjust mechanism which is integral with the keyboard base, and is economical to manufacture, easy to assemble, and simple to operate.

While the invention has been described in connection with what is presently considered to be the most practical and preferred embodiment, it is understood that the invention is not to be limited to the disclosed embodiment. For example, the present invention need not be employed in a keyboard, but may be utilized to adjust the angle or height of any object. Accordingly, the invention includes various modifications and equivalent arrangements included within the spirit and scope of the appended claims, which scope is to be accorded the broadest interpretation so as to encompass all such modifications and equivalent structures.

We claim:

1. Apparatus for adjusting the height of an object comprising:
    an object whose height is to be adjusted;
    adjustment foot means, pivotally mounted within said object, for raising said object;
    adjustment lever means, pivotally mounted within said object, for engaging said adjustment foot means to cause said object to be supported in a raised position; and
    a single spring having a first end coupled to said foot means and a second end coupled to said lever means to simultaneously (a) bias said foot means in a direction to cause said foot means to be fully lowered, and (b) bias said lever means in a direction to cause said lever means to engage said foot means.

2. Apparatus according to claim 1 further including support means, mounted within said object, for supporting said lever means, and wherein said foot means includes a first spring fixing pin for connecting said single spring to said foot means, and wherein said lever means includes a second spring fixing pin for connecting said single spring to said lever means.

3. Apparatus according to claim 2 wherein said first spring fixing pin has a length sufficient to ensure that said single spring remains connected to said foot means, and wherein said second spring fixing pin is arranged in close proximity to said support means so that said single spring is incapable of passing between said second spring fixing pin and said support means to maintain said single spring on said second spring fixing pin.

4. Apparatus according to claim 1 wherein said foot means and said lever means are arranged so that said apparatus has a vertical height $Y_1$ within said object, and wherein said foot means extends a maximum vertical distance $Y_2$ from said object, where $Y_2$ is greater than $Y_1$.

5. Apparatus according to claim 4 wherein $Y_2$ and $Y_1$ are approximately equal to 1.4 inches and 1.0 inches, respectively.

6. Apparatus according to claim 1 wherein said foot means includes a ratchet surface having a predetermined number of detents which said lever means may engage, said foot means raising said object to a height which is selectable based on said detents.

7. Apparatus according to claim 6 wherein said lever means includes a pawl which engages one of said detents.

8. Apparatus according to claim 7 wherein said number of detents is four, and wherein said foot means may be adjusted at approximate angles of 45°, 28°, 14° and 0° with respect to said object when said pawl engages different ones of said detents.

9. Apparatus according to claim 8 wherein said object is a keyboard and defines a volume having a boundary, and wherein said apparatus is disposed entirely within said boundary when said foot means is adjusted to said 0° angle.

10. Apparatus for adjusting the angle between an object and a surface supporting said object, comprising:
   an object whose angle with respect to said surface is to be adjusted;
   adjustment foot means, pivotally mounted within said object and having a ratchet surface, for supporting said object on said surface at one of a predetermined series of angles determined by said ratchet surface;
   adjustment lever means, pivotally mounted within said object and having a pawl, for fixing said foot means at one of a predetermined series of positions by engaging said pawl with said ratchet surface; and
   a single spring, connected at predetermined locations on said foot means and said lever means, to cause said foot means to be biased in a downward direction to a fully lowered position, and to cause said lever means to be biased to cause said pawl to engage said ratchet surface;
   said foot, lever, and spring means being so arranged that said apparatus has a vertical height $Y_1$ within said object, and said foot means extends a maximum distance $Y_2$ from said object, where $Y_2$ is greater than $Y_1$.

11. Apparatus according to claim 10 wherein said ratchet surface includes four detents, and wherein said pawl engages one of said detents to cause said foot means to assume one of said positions.

12. Apparatus according to claim 10 wherein said object is a keyboard and defines a rectangular volume having a boundary, and wherein said apparatus is entirely enclosed within said boundary when said keyboard lies flat on said surface.

13. Apparatus according to claim 10 further including support means, mounted on said object, for supporting said lever means, and wherein said foot means includes a first spring pin for connecting said single spring to said foot means, and wherein said lever means includes a second spring pin for connecting said single spring to said lever means.

14. Apparatus according to claim 13 wherein said second spring pin is in close proximity to said support means so that said single spring is incapable of passing between said second spring pin and said support means to maintain said single spring on said second spring fixing pin.

15. Apparatus for adjusting the angle between a keyboard and a surface supporting said keyboard, said keyboard including a keyboard base defining a volume having a boundary, said base having at least one hole therein and including at least one adjustment device, each adjustment device including:
   a keyboard;
   first, second, third and fourth support members mounted on said base within said keyboard;
   an adjustment foot pivotally mounted between said first and second support members and capable of downward movement through one of said holes in said base, said foot having a ratchet surface including a plurality of detents by which said downward movement may be halted at positions corresponding to said detents, said foot including a first spring pin having a length, and a stop pin which comes into contact with said base when said foot is extended at a maximum distance from said base;
   an adjustment lever pivotally mounted between said third and fourth support members and having an end extending through another of said holes of said base, said lever having a pawl which engages said detents to support said foot at one of said positions, said lever including a second spring pin mounted in close proximity to said third support member; and
   a coil spring having a first end on said first spring pin and a second end on said second spring pin, said spring being so arranged that said first end is prevented from sliding off of said first spring pin by said pin length, and said second end is incapable of sliding off of said second spring pin by the close proximity of said third support member, said spring biasing said foot in a downward direction and biasing said pawl to engage one of said detents, each said adjustment device being entirely within said volume boundary when said keyboard is lying flat on said surface.

16. Apparatus according to claim 15 wherein said device occupies a vertical distance $Y_1$ within said keyboard base, and wherein said foot extends a maximum vertical distance $Y_2$ from said base, $Y_2$ being greater than $Y_1$.

17. Apparatus according to claim 16 wherein said foot includes four detents so arranged that said foot defines angles of approximately 45°, 28°, 14° and 0° with respect to said base when said pawl engages successive ones of said four detents.

* * * * *